United States Patent
Yoo et al.

(10) Patent No.: US 7,830,487 B2
(45) Date of Patent: Nov. 9, 2010

(54) LIQUID CRYSTAL DISPLAY WITH PIXEL ELECTRODES HAVING INTERDIGITATED PORTIONS

(75) Inventors: Seung-hoo Yoo, Gyeonggi-do (KR); Hak-sun Chang, Gyeonggi-do (KR); Hyun-wuk Kim, Gyeonggi-do (KR); Hee-wook Do, Gyeonggi-do (KR); Yoon-sung Um, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1108 days.

(21) Appl. No.: 11/511,147

(22) Filed: Aug. 28, 2006

(65) Prior Publication Data

US 2007/0052902 A1  Mar. 8, 2007

(30) Foreign Application Priority Data

Sep. 6, 2005  (KR) .................. 10-2005-0082837

(51) Int. Cl.
*G02F 1/1343* (2006.01)
*G02F 1/136* (2006.01)
*G02F 1/1337* (2006.01)

(52) U.S. Cl. .................. 349/144; 349/48; 349/129; 349/139; 349/141

(58) Field of Classification Search .................. 349/48, 349/129, 141, 144, 139
See application file for complete search history.

(56) References Cited

U.S. PATENT DOCUMENTS

| | | | | |
|---|---|---|---|---|
| 5,801,802 A * | 9/1998 | Inoue et al. | ................. | 349/129 |
| 5,822,027 A * | 10/1998 | Shimada et al. | ............... | 349/39 |
| 6,459,465 B1 * | 10/2002 | Lee | ............................ | 349/141 |
| 2004/0109103 A1 * | 6/2004 | Ota et al. | ....................... | 349/56 |
| 2004/0150777 A1 * | 8/2004 | Koike | .......................... | 349/139 |
| 2004/0189916 A1 * | 9/2004 | Song | .......................... | 349/139 |
| 2006/0146248 A1 * | 7/2006 | Park | .......................... | 349/141 |

* cited by examiner

*Primary Examiner*—Michael H Caley
(74) *Attorney, Agent, or Firm*—F. Chau & Associates, LLC

(57) ABSTRACT

Provided is a liquid crystal display that includes a first substrate, a second substrate opposite to and facing the first substrate, and a liquid crystal layer interposed between the first substrate and the second substrate, wherein the first substrate includes a common electrode, the second substrate includes gate lines disposed on an insulating plate, first and second data lines insulated from and intersecting the gate lines and receiving complementary data signals, a first thin film transistor connected to the first data line, a second thin film transistor connected to the second data line, a first pixel electrode connected to an output terminal of the first thin film transistor, and a second pixel electrode connected to an output terminal of the second thin film transistor, the first pixel electrode has two or more interconnected sub-pixel electrodes, the second pixel electrode has two or more interconnected sub-pixel electrodes, and the sub-pixel electrodes of the first pixel electrode are interdigitated with the sub-pixel electrodes of the second pixel electrode.

26 Claims, 7 Drawing Sheets

LIQUID CRYSTAL DISPLAY WITH PIXEL ELECTRODES HAVING INTERDIGITATED PORTIONS

CROSS-REFERENCE TO RELATED PATENT APPLICATION

This application claims priority from Korean Patent Application No. 10-2005-0082837 filed on Sep. 6, 2005 in the Korean Intellectual Property Office, the disclosure of which is incorporated by reference herein in its entirety.

BACKGROUND OF THE INVENTION

1. Field of the Invention

The present invention relates to a liquid crystal display, and more particularly, to a liquid crystal display having an increased domain width while having increased response speed and transmittance.

2. Description of the Related Art

A liquid crystal display (LCD) is one of the most widely used flat panel displays. An LCD includes a thin film transistor substrate provided with pixel electrodes and a common electrode substrate provided with a common electrode and a liquid crystal (LC) layer interposed therebetween. The LCD displays images by applying voltages to the pixel electrodes and the common electrode to generate an electrical field in the LC layer, which determines orientations of LC molecules in the LC layer to adjust transmittance of light.

A vertical alignment (VA) mode LCD aligns LC molecules such that the long axes of the LC molecules are perpendicular to the substrates in the absence of an electrical field, resulting in a high contrast ratio and wide reference viewing angle.

The wide viewing angle of the VA mode LCD can be realized by cutouts in the electrical field-generating electrodes and protrusions on the electrical field-generating electrodes. Since the cutouts and the protrusions can determine the tilt directions of the LC molecules, the tilt directions can be distributed into several directions by using the cutouts and the protrusions such that the reference viewing angle is widened.

As described above, in VA mode liquid crystal displays, pixel electrodes are divided into a plurality of domains by forming cutouts or protrusions to realize a wide viewing angle. In this case, liquid crystal molecules near the cutouts or the protrusions are rapidly tilted, whereas liquid crystal molecules away from the cutouts or the protrusions are slowly tilted, thereby resulting in a reduction in response speed. Furthermore, as the number of domains of one pixel increases, transmittance decreases. Conversely, as the number of domains of one pixel decreases, transmittance increases but a domain width, increases, which makes it difficult to effectively control liquid crystal molecules and thus makes the alignment direction of the liquid crystal molecules unstable, thereby resulting in textures, ultimately resulting in a reduction of brightness.

SUMMARY OF THE INVENTION

According to an exemplary embodiment of the present invention, there is provided a liquid crystal display including a first substrate, a second substrate opposite to and facing the first substrate, and a liquid crystal layer interposed between the first substrate and the second substrate, wherein the first substrate includes a common electrode, the second substrate includes gate lines disposed on an insulating plate, first and second data lines insulated from and intersecting the gate lines and receiving complementary data signals, a first thin film transistor connected to the first data line, a second thin film transistor connected to the second data line, a first pixel electrode connected to an output terminal of the first thin film transistor, and a second pixel electrode connected to an output terminal of the second thin film transistor, the first pixel electrode has two or more interconnected sub-pixel electrodes, the second pixel electrode has two or more interconnected sub-pixel electrodes, and the sub-pixel electrodes of the first pixel electrode are interdigitated with the sub-pixel electrodes of the second pixel electrode.

BRIEF DESCRIPTION OF THE DRAWINGS

Exemplary embodiments of the present invention can be understood in more detail from the following descriptions taken in conjunction with the attached drawings in which.

DETAILED DESCRIPTION OF EXEMPLARY EMBODIMENTS

Exemplary embodiments of the present invention will now be described more fully hereinafter with reference to the accompanying drawings. The present invention may, however, be embodied in many different forms and should not be construed as being limited to the embodiments set forth herein.

Figure 1:
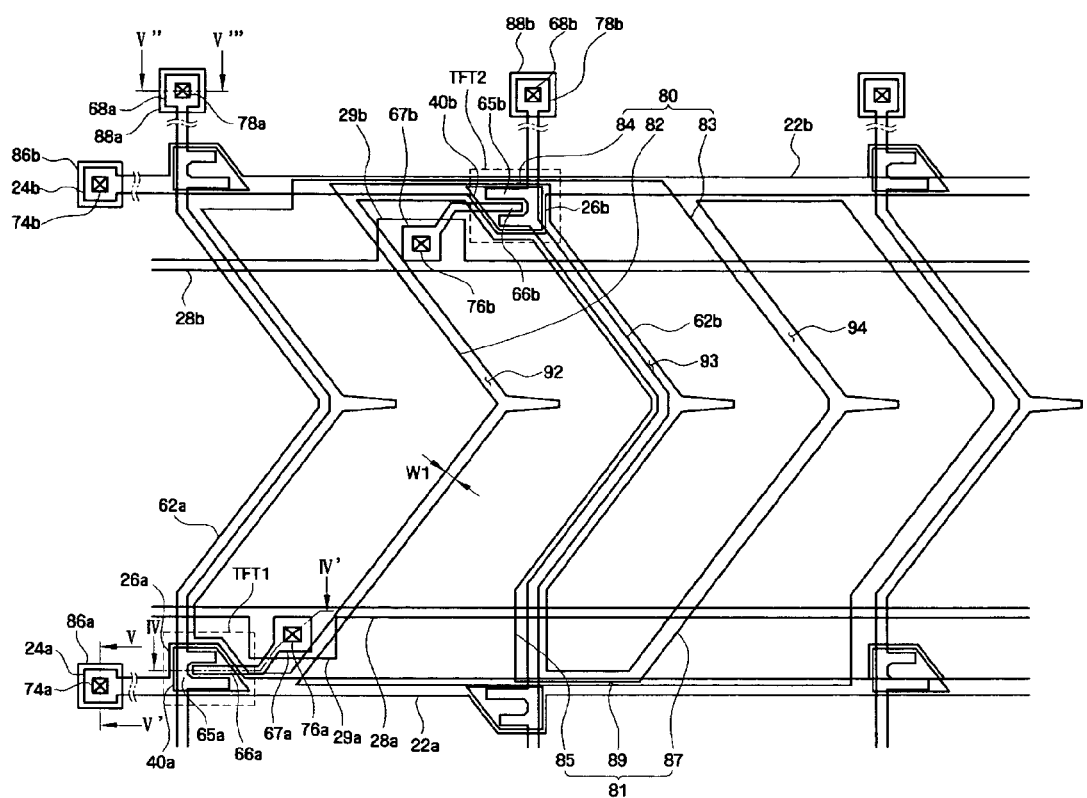
FIG. 1 shows a layout view of a thin film transistor substrate for a liquid crystal display according to an embodiment of the present invention.
Figure 2:
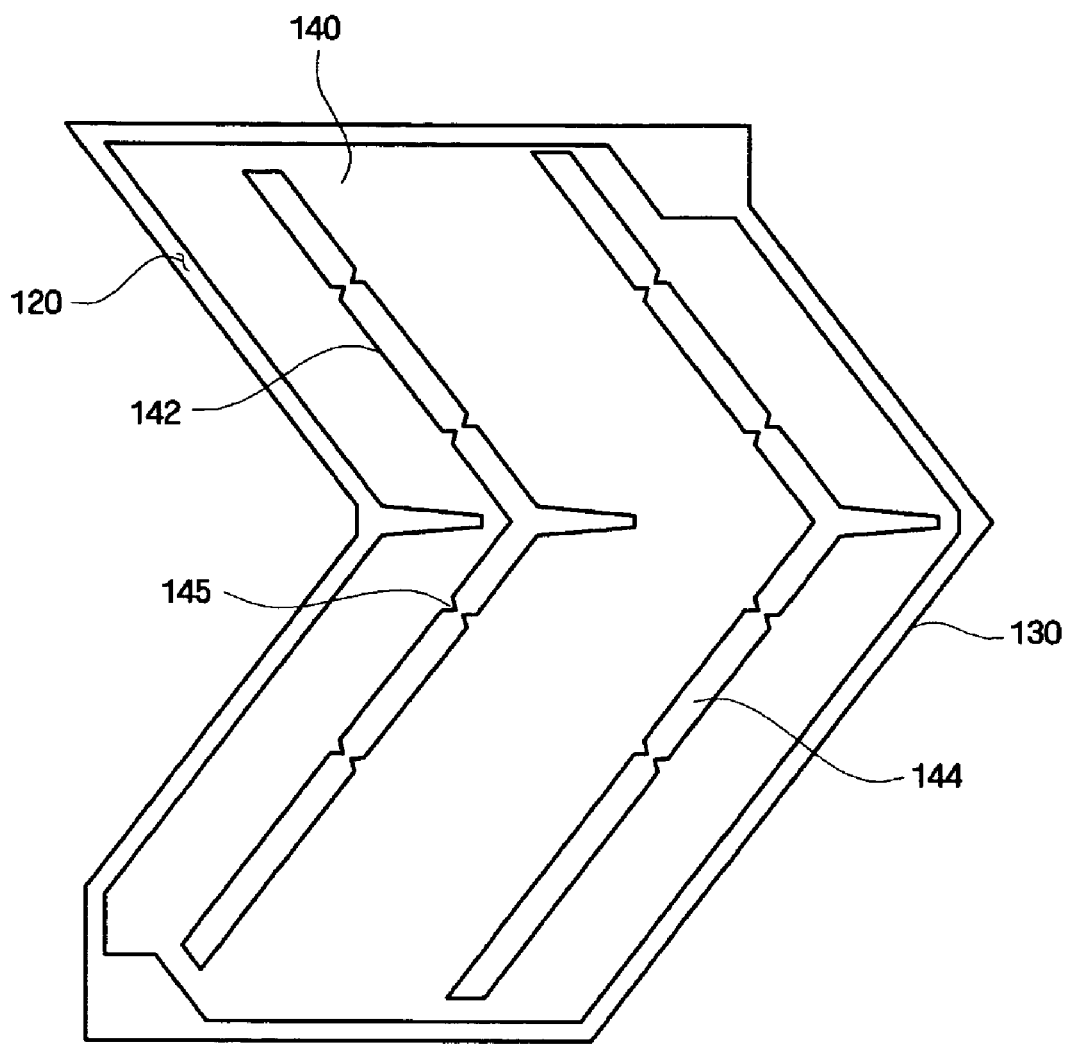
FIG. 2 shows a layout view of a common electrode substrate for a liquid crystal display according to an embodiment of the present invention.
Figure 3:
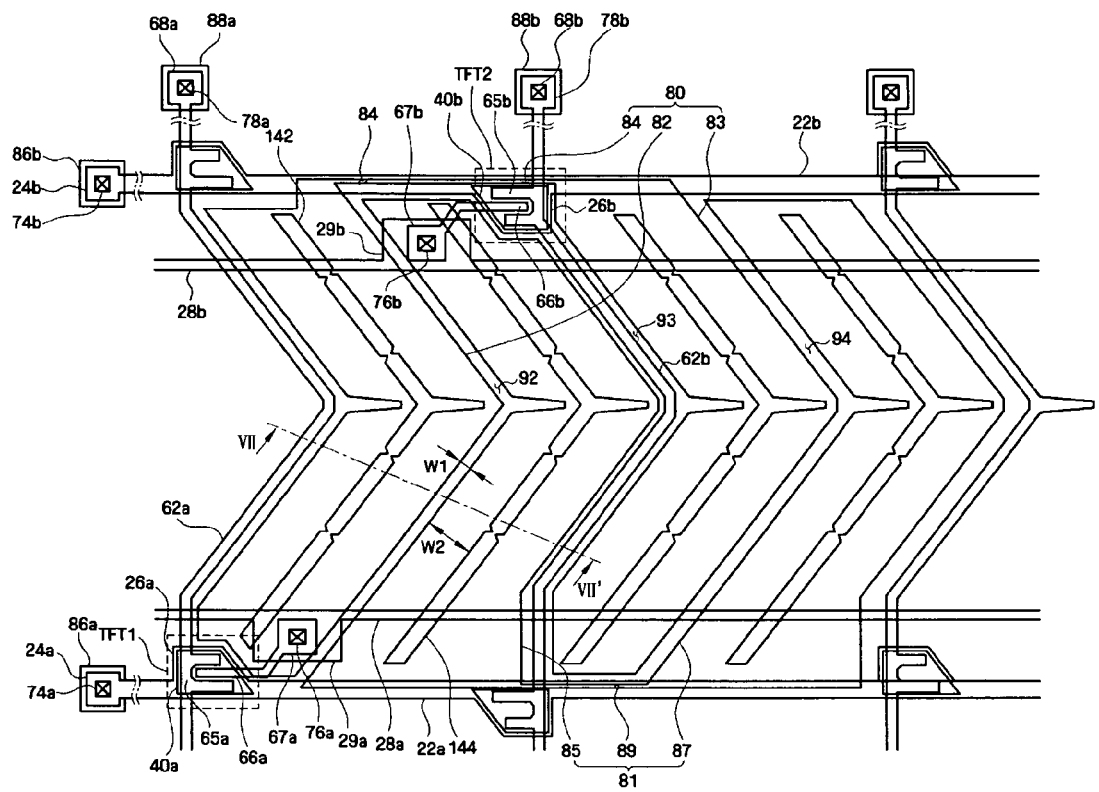
FIG. 3 shows a layout view of a liquid crystal display including the thin film transistor substrate of FIG. 1 and the common electrode substrate of FIG. 2.
Figure 4:
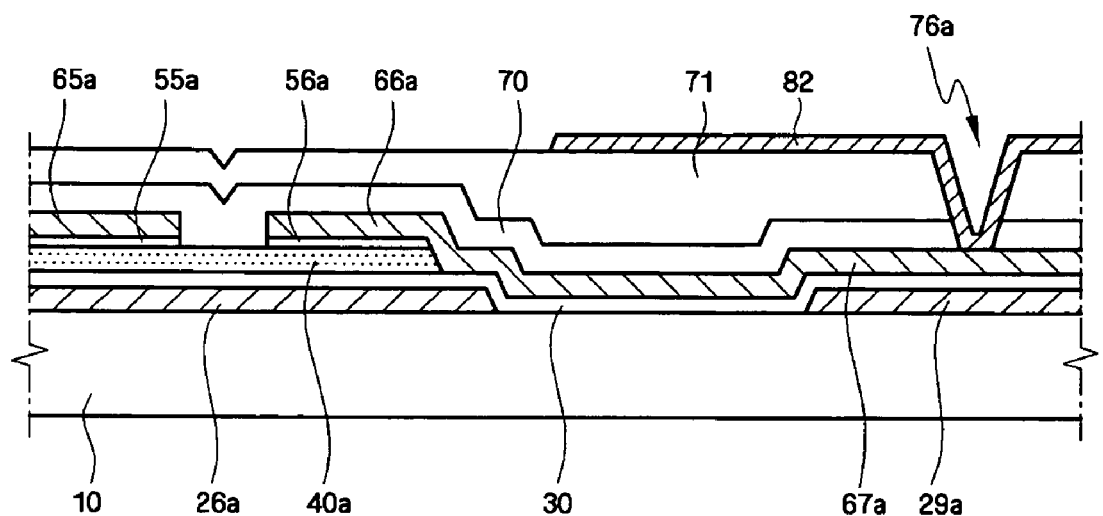
FIG. 4 is a sectional view taken along a line IV-IV' of FIG. 1.
Figure 5:
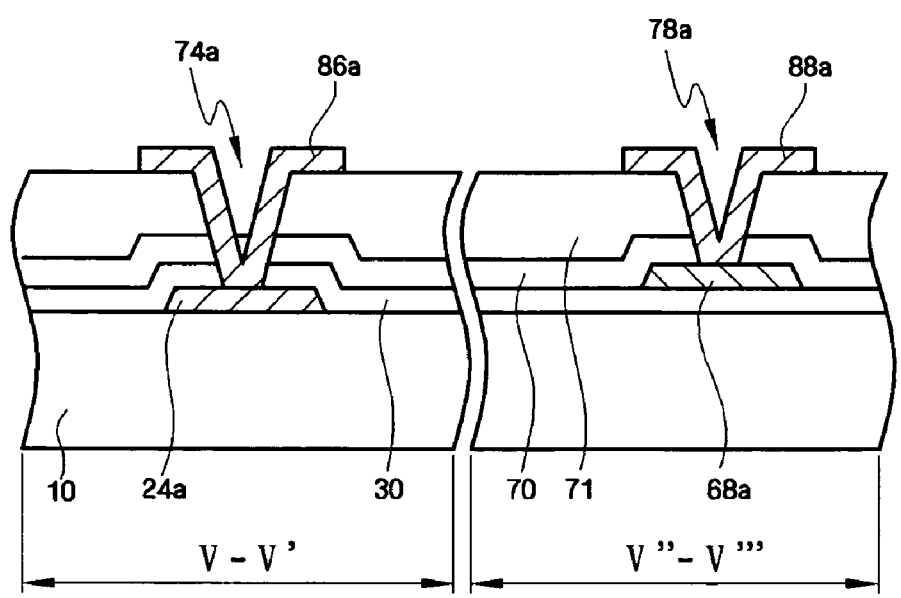
FIG. 5 is two sectional views taken along a line V-V' and a line V"-V'" of FIG. 1.
Figure 6A:
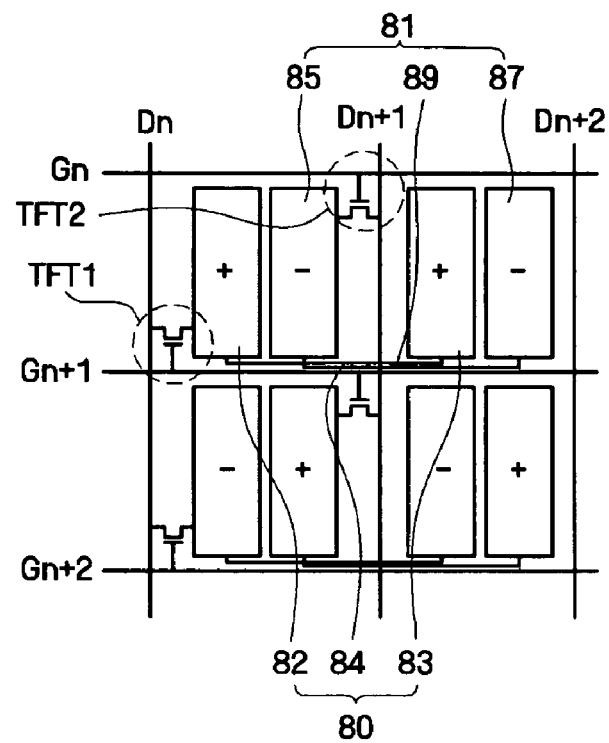
FIGS. 6A and 6B show views illustrating the polarities of voltages applied to pixel electrodes for a liquid crystal display according to an embodiment of the present invention.
Figure 6B:
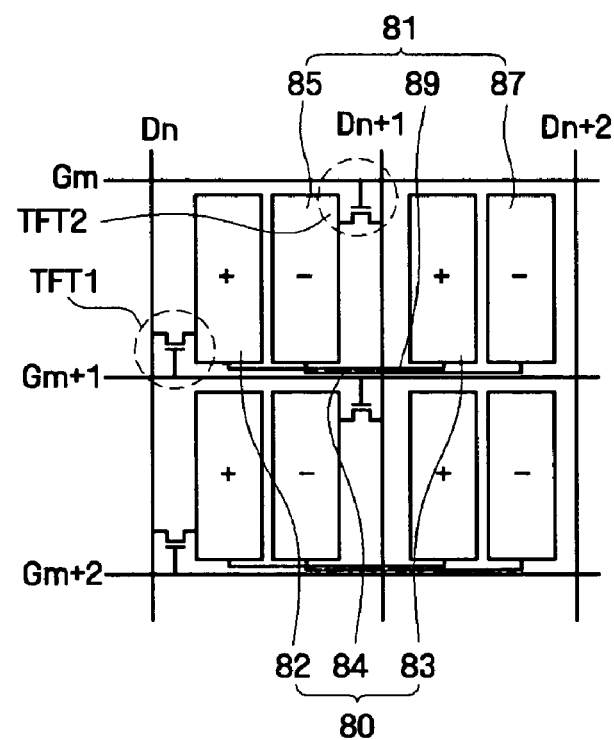
Figure 7:
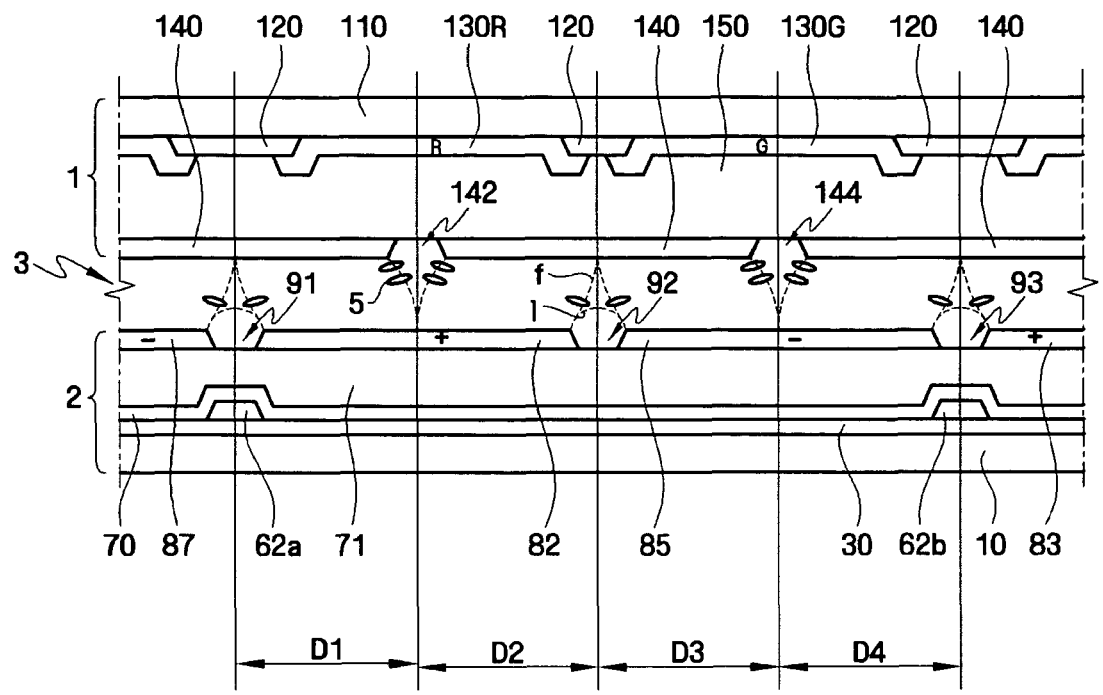
FIG. 7 is a sectional view taken along a line VII-VII' of FIG. 3.
Figure 8:
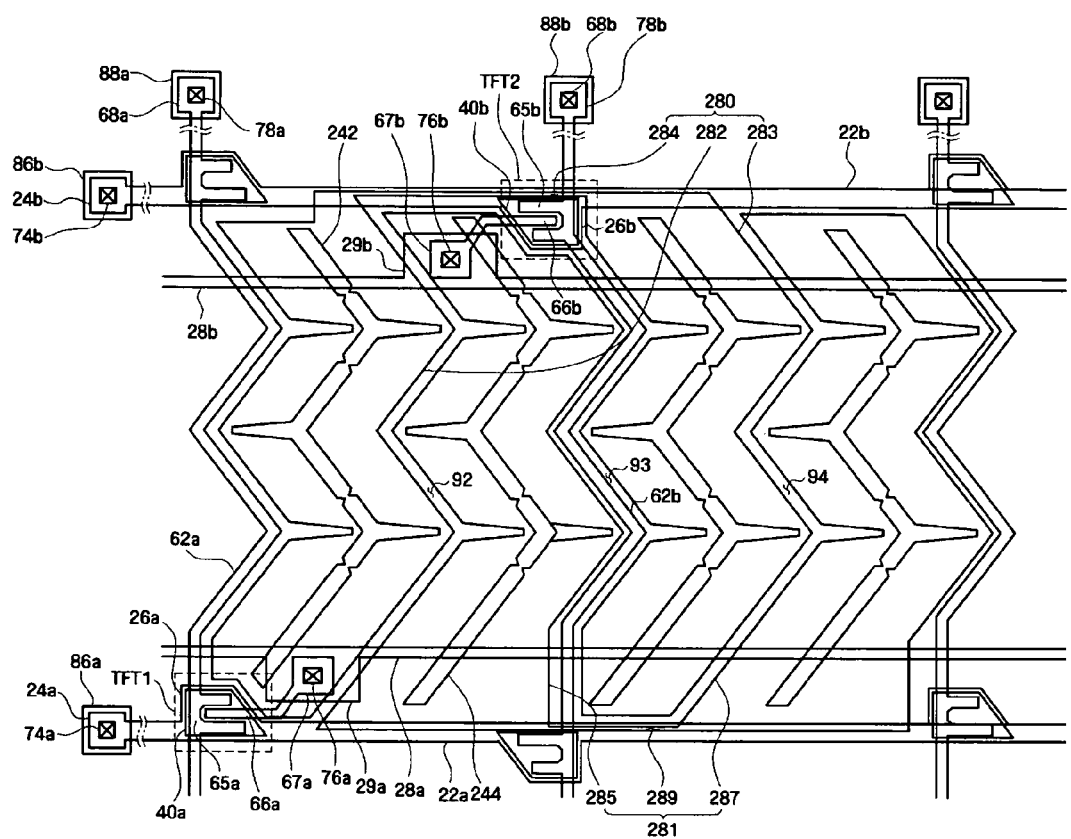
FIG. 8 shows a layout view of a liquid crystal display according to an embodiment of the present invention.

FIG. 1 shows a layout view of a thin film transistor substrate for a liquid crystal display according to an embodiment of the present invention, FIG. 2 shows a layout view of a common electrode substrate for a liquid crystal display according to an embodiment of the present invention, FIG. 3 shows a layout view of a liquid crystal display including the thin film transistor substrate of FIG. 1 and the common electrode substrate of FIG. 2, FIG. 4 is a sectional view taken along a line IV-IV' of FIG. 1, FIG. 5 is two sectional views taken along a line V-V' and a line V"-V'" of FIG. 1, FIGS. 6A and 6B show views illustrating the polarities of voltages applied to pixel electrodes for a liquid crystal display according to an embodiment of the present invention, FIG. 7 is a sectional view taken along a line VII-VII' of FIG. 3, and FIG. 8 shows a layout view of a liquid crystal display according to another embodiment of the present invention.

As shown in FIG. 7, the liquid crystal display (LCD) includes a common electrode substrate 1, a thin film transistor (TFT) substrate 2 which faces the common electrode substrate 1, and a liquid crystal layer 3 formed between the common electrode and TFT substrates 1 and 2 and orientated so the long axes of liquid crystal molecules 5 are vertically aligned.

The TFT substrate 2 will first be described with reference to FIGS. 1, 4, and 5.

First and second gate lines 22a and 22b are formed in a transverse direction on an insulating plate 10, and first and second gate electrodes 26a and 26b in forms of protrusions are formed in the first and second gate lines 22a and 22b. The first and second gate line pads 24a and 24b transmit gate signals applied from other layers or external devices to the first and second gate lines 22a and 22b. Widths of the gate line pads 24a and 24b extend to be connected to external circuits. The first and second gate lines 22a and 22b, the first and second gate electrodes 26a and 26b, and the first and second gate line pads 24a and 24b constitute a gate wire (22a, 22b, 26a, 26b, 24a, 24b).

In addition, first and second storage electrode lines 28a and 28b, and first and second storage electrodes 29a and 29b are formed on the insulating plate 10. The first and second storage electrode lines 28a and 28b extend in a longitudinal direction, intersecting a pixel region, and the first and second storage electrodes 29a and 29b having larger width than the first and second storage electrode lines 28a and 28b are formed in the first and second storage electrode lines 28a and 28b. The first and second storage electrode lines 28a and 28b and the first and second storage electrodes 29a and 29b constitute a storage electrode wire (28a, 28b, 29a, 29b). The shape and arrangement of the storage electrode wire may vary.

A gate insulating layer 30 is formed on the gate wire (22a, 22b, 24a, 24b, 26a, 26b) and the storage electrode wire (28a, 28b, 29a, 29b).

The first and second semiconductor layers 40a and 40b formed of hydrogenated amorphous silicon or polycrystalline silicon are formed on the gate insulating layer 30. The first and second semiconductor layers 40a and 40b may have various shapes such as island shapes or line shapes. For example, the first and second semiconductor layers 40a and 40b may be formed in an island shape. When the first and second semiconductor layers 40a and 40b are formed in a line shape; they may be disposed under first and second data lines 62a and 62b and extend. In addition, when the first and second semiconductor layers 40a and 40b are formed in the island shape, they are disposed under the first and second data lines 62a and 62b and may extend in upper portions of the gate electrodes 26a and 26b.

An island-shaped ohmic contact layer or a linear ohmic contact layer formed of a material such as suicide or n+ hydrogenated amorphous silicon in which n-type impurities are doped with high concentration is formed on the first and second semiconductor layers 40a and 40b. The first and second ohmic contact layers 55a, 55b, 56a and 56b of the present embodiment are island-shaped ohmic contact layers and placed under first and second source electrodes 65a and 65b and first and second drain electrodes 66a and 66b, respectively.

The first and second data lines 62a and 62b and the first and second drain electrodes 66a and 66b are formed on the first and second ohmic contact layers 55a, 55b, 56a, and 56b and the gate insulating layer 30. First and second data line pads 68a and 68b transmit data signals applied from other layers or external devices to the first and second data lines 62a and 62b. Widths of the first and second data line pads 68a and 68b extend to be connected to external circuits. The source electrodes 65a and 65b that extend in upper portions of the first and second ohmic contact layers 55a and 55b are formed as branches of the first and second data lines 62a and 62b. The first and second data line pads 68a and 68b are formed at ends of the first and second data lines 62a and 62b. The first and second drain electrodes 66a and 66b are formed on the first and second ohmic contact layers 56a and 56b positioned opposite to the first and second source electrodes 65a and 65b with respect to the first and second gate electrodes 26a and 26b. The first and second data lines 62a and 62b, the first and second data line pads 68a and 68b, and the first and second source electrodes 65a and 65b constitute a data wire (62a, 62b, 68a, 68b, 65a, 65b).

Here, the first and second data lines 62a and 62b are multiply bent and include longitudinal portions. Here, the bent portions of the first and second data lines 62a and 62b include a pair of linear portions, one forming an angle of about 45 degrees with respect to the first or second gate lines 22a, 22b, the other forming an angle of about −45 degrees with respect to the first or second gate lines 22a, 22b. The longitudinal portions are connected to the first and second source electrodes 65a and 65b and intersect the first and second gate lines 22a and 22b and the first and second storage electrode lines 28a and 28b, respectively.

In this case, the length of the bent portion is about one to nine times the length of the longitudinal portions. That is, it occupies about 50-90% of the total length of the bent portion and the longitudinal portions. However, as the first and second data lines 62a and 62b are bent, the length of the wire is increased. Thus, if the bent portion of the first and second data lines 62a and 62b amounts to about 50%, the length of the wire increases about 20%. If the length of the first and second data lines 62a and 62b increases, the wire resistance and load are increased accordingly, so a signal distortion may increase. However, in a TFT-LCD as shown in FIG. 1, the first and second data lines 62a and 62b can be formed sufficiently wide. Further, since a thick organic film 71 is used, the load of the wire can be considerably reduced so the signal distortion due to an increase in the length of the first and second data lines 62a and 62b can be ignored.

In this way, the first and second data lines 62a and 62b may be formed by a combination of longitudinal and bent band shapes like a pixel shape. However, the invention is not limited to the illustrated example, and the first and second data lines 62a and 62b may be formed in simply linear or bent band shapes.

In addition, the first and second drain electrodes 66a and 66b overlap the first and second storage electrodes 29a and 29b with the gate insulating layer 30 interposed therebetween, thereby forming a storage capacitor.

The first and second drain electrodes 66a and 66b include strip-type end portions overlapping the semiconductor layers 40a and 40b and drain electrode extensions 67a and 67b extending from the strip-type end portions, which are wider than the strip-type end portions, overlapping the first and second storage electrodes 29a and 29b.

A passivation layer 70 made of an organic insulating layer having good flatness characteristics is formed on the first and second data lines 62a and 62b, the first and second drain electrodes 66a and 66b, and an exposed portion of the first and second semiconductor layers 40a and 40b therethrough. Here, the passivation layer 70 is preferably made of an inorganic insulator such as silicon nitride or silicon oxide, a photosensitive organic material, or a low dielectric insulating material such as a-Si:C:O and a-Si:O:F formed by plasma enhanced chemical vapor deposition (PECVD).

An organic film 71 may be an organic material having good flatness characteristics and photosensitivity applied on the passivation layer 70. The organic film 71 may reduce parasitic capacitance between the first and second drain electrodes 66a and 66b and first and second pixel electrodes 80 and 81. The organic film 71 may be formed in PFCB (PerFluoroCycloButane), BCB (BenzoCycloButene) or acryl.

Contact holes 78a, 78b, 76a, and 76b respectively exposing the first and second data line pads 68a and 68b and the first and second drain electrode extensions 67a and 67b are formed on the organic film 71. Contact holes 74a and 74b exposing the first and second gate line pads 24a and 24b are formed in the passivation layer 70, the organic film 71 and the gate insulating layer 30. The first and second pixel electrodes 80 and 81 are electrically connected to the first and second drain electrodes 66a and 66b through the contact holes 76a and 76b and formed in bent band shapes along the first and second data lines 62a and 62b.

In addition, first and second auxiliary gate line pads 86a and 86b and first and second data line pads 88a and 88b are formed on the passivation layer 70 through the contact holes 74a, 74b, 78a, and 78b. The first and second auxiliary gate line pads 86a and 86b and the first and second auxiliary data line pads 88a and 88b are connected to the first and second gate line pads 24a and 24b and the first and second data line pads 68a and 68b, respectively. Here, the first and second pixel electrodes 80 and 81, the first and second auxiliary gate and the first and second data line pads 86a, 86b. 88a and 88b are formed of a transparent conductor such as ITO or IZO or a reflective conductor such as Al. The first and second auxiliary gate and data line pads 86a, 86b, 88a and 88b complement the adhesion between the first and second gate and data line pads 24a, 24b, 68a and 68b and external devices.

The first and second pixel electrodes 80 and 81 are physically and electrically connected to the first and second drain electrodes 66a and 66b through the contact holes 76a and 76b and receive data voltages from the drain electrodes 66a and 66b.

The first and second pixel electrodes 80 and 81, to which the data voltage is applied, generate an electrical field together with a common electrode 140 of the common electrode substrate 1, to determine the arrangement of the liquid crystal molecules 5 of the liquid crystal layer 3 between the first and second pixel electrodes 80 and 81 and the common electrode 140.

A first pixel electrode and a second pixel electrode for a liquid crystal display according to an embodiment of the present invention will be described in detail.

A first pixel electrode 80 is a pixel corresponding to a predetermined color component of a color filter (see 130 of FIG. 2), and includes a first sub-pixel electrode 82, a second sub-pixel electrode 83, and a first bridge 84 connecting the first and second sub-pixel electrodes 82 and 83.

The first sub-pixel electrode 82 is formed adjacent to the first data line 62a in a bent band shape and the second sub-pixel electrode 83 is formed adjacent to the second data line 62b in a bent band shape. The first bridge 84 connects the first sub-pixel electrode 82 and the second sub-pixel electrode 83.

The second pixel electrode 81 is a pixel corresponding to a different color component from the color filter 130 corresponding to the first pixel electrode 80, and includes a third sub-pixel electrode 85, a fourth sub-pixel electrode 87, and a second bridge 89 connecting the third and fourth sub-pixel electrodes 85 and 87.

The third sub-pixel electrode 85 is formed adjacent to the first sub-pixel electrode 82 in a bent band shape, and the fourth sub-pixel electrode 87 is formed adjacent to the second sub-pixel electrode 83 in a bent band shape. The second bridge 89 connects the third sub-pixel electrode 85 and the fourth sub-pixel electrode 87.

The first and second sub-pixel electrodes 82 and 83 connected by the first bridge 84 are alternately engaged (interdigitated) with the third and fourth sub-pixel electrodes 85 and 87 connected by the second bridge 89. Here, the first pixel electrode 80 and the second pixel electrode 81 divide an area defined by the first and second gate lines 22a and 22b and the first data line 62a of either end into substantially two equal parts in a longitudinal direction.

The first and second bridges 84 and 89 may overlap the second and first gate lines 22b and 22a, respectively. When data signals are applied to the first and second pixel electrodes 80 and 81, a texture phenomenon in which liquid crystal molecules above the first and second bridges 84 and 89 rotate in different directions may occur. If light is transmitted through the textures, staining and a latent image may be caused on a liquid crystal panel. If the first and second bridges 84 and 89 overlap the second and first gate lines 22b and 22a, respectively, light transmission through the textures can be avoided. While the embodiment described with reference to FIG. 1 shows that the first and second bridges 84 and 89 overlap the second and first gate lines 22b and 22a, respectively, the first and second bridges 84 and 89 may also overlap storage electrode lines.

Here, the first pixel electrode 80 receives a data signal from the first drain electrode 66a of a first thin film transistor TFT1, and the second pixel electrode 81 receives another data signal from the second drain electrode 66b of a second thin film transistor TFT2. The polarity of the data signal applied to the first pixel electrode 80 is opposite to that of the data signal applied to the second pixel electrode 81. For example, if the first pixel electrode 80 receives a positive (+) voltage, the second pixel electrode 81 may receive a negative (−) voltage. A driving method for applying voltages of opposite polarities to the first and second pixel electrodes 80 and 81 will later be described in more detail.

Inter-subpixel electrode gaps 92 and 94 are formed between the first sub-pixel electrode 82 and the third sub-pixel electrode 85 and between the second sub-pixel electrode 83 and the fourth sub-pixel electrode 87, respectively. When signals of opposite polarities are applied to the first and second pixel electrodes 80 and 81, lateral electrical fields are formed at the inter-subpixel electrode gaps 92 and 94, respectively. To increase a total size of pixels and to enhance the response speed of liquid crystal molecules by forming electrical fields at the inter-subpixel electrode gaps 92 and 94, an interval W1 of each of the inter-subpixel electrode gaps 92 and 94 is preferably in a range of about 6 μm to about 8 μm. In addition, an inter-subpixel electrode gap 93 may be formed between the second sub-pixel electrode 83 and the third sub-pixel electrode 85. A lateral electrical field is also formed at the inter-subpixel electrode gap 93 when signals of opposite polarities are applied to the first pixel electrode 80 and the second pixel electrode 81. When liquid crystal molecules are tilted in a predetermined direction by a fringe electrical field formed between a common electrode 140, which will later be described, the first and second pixel electrodes 80 and 81, these lateral electrical fields are formed in substantially the same direction as the tilt direction of the liquid crystal molecules. Thus, the lateral electrical fields encourage the behavior of liquid crystal molecules based on the fringe electrical field.

The present invention illustrates that each of the first and second pixel electrodes includes two sub-pixel electrodes, but the present invention is not limited thereto. Provided that sub-pixel electrodes of a first pixel electrode are interdigitated with those of a second pixel electrode and adjacent sub-pixel electrodes have opposite polarities, each of the first and second pixel electrodes may include three or more sub-pixel electrodes.

Hereinafter, the common electrode substrate 1 will be described in more detail with reference to FIGS. 2, 3, and 7.

Referring to FIGS. 2, 3, and 7, a black matrix 120 for preventing light leakage and a color filter 130 comprised of red, green, and blue components are disposed on a lower surface of an insulating substrate 110 made of a transparent insulating material such as glass. An overcoat layer 150 made of an organic material is disposed on a lower surface of the color filter 130. The common electrode 140 made of a transparent conductive material such as ITO or IZO and having cutouts 142 and 144 is disposed below the overcoat layer 150. The black matrix 120 includes linear portions corresponding to bent portions of each of the first and second data lines 62$a$ and 62$b$, and triangular portions corresponding to longitudinal portions of the first and second data lines 62$a$ and 62$b$ and first and second thin film transistors TFT1 and TFT2.

The color filter 130 extends in a longitudinal direction across an area defined by the black matrix 120, and is bent periodically according to the shapes of first and second pixel electrodes 80 and 81. The color filter 130 may be constructed such that the first and second pixel electrodes 80 and 81 have two different color components. In this case, since the first and second sub-pixel electrodes 82 and 83 of the first pixel electrode 80 are separated a predetermined distance from each other, the color components of the color filter 130 corresponding to the first pixel electrode 80 are also separated apart from each other. Likewise, since third and fourth sub-pixel electrodes 85 and 87 of the second pixel electrode 81 are separated a predetermined distance from each other, color components of the color filter 130 corresponding to the second pixel electrode 81 are separated from each other. While the exemplary embodiment has illustrated that the color filter 130 is arranged on the common electrode substrate 1, the color filter 130 may also be arranged on the TFT substrate 2.

The common electrode 140 is opposite to and faces the first and second pixel electrodes 80 and 81. Each of the first and second cutouts 142 and 144 of the common electrode 140 includes a portion which is tilted at an angle of about 45 degrees with respect to a first gate line 22$a$ or a second gate line 22$b$ and a portion which is tilted at an angle of about −45 degrees with respect to the first gate line 22$a$ or the second gate line 22$b$. Alternatively, protrusions may be formed at the first and second cutouts 142 and 144 of the common electrode 140. The first and second cutouts 142 and 144 or the protrusions are referred to as domain-dividing means.

Here, the first and second cutouts 142 and 144 are bent according to bent shapes of pixels. The first cutout 142 corresponds to each of the first and the second sub-pixel electrodes 82 and 83, and the second cutout 144 corresponds to each of the third and fourth sub-pixel electrodes 85 and 87. Since the first and second cutouts 142 and 144 of the common electrode 140 are bent according to the shapes of the first and second pixel electrodes 80 and 81, each of the first through fourth sub-pixel electrodes 82, 83, 85, and 87 is longitudinally divided into substantially two equal parts by each corresponding one of the first and second cutouts 142 and 144. The first and second cutouts 142 and 144 serve as domain-dividing means, and may have a width of about 9 μm to about 12 μm. If the first and second cutouts 142 and 144 are formed of organic protrusions, they may have a width of about 5 μm to about 10 μm.

The first and second cutouts 142 and 144 may have wedge-shaped notches 145. The notches 145 may be triangular, square, trapezoidal, or semi-circular shaped.

An alignment layer (not shown) that allows liquid crystal molecules 5 to be aligned in a predetermined direction may be disposed on the common electrode 140.

When a liquid crystal layer 3 is inserted between the common electrode substrate 1 and the TFT substrate 2 coupled to each other and the liquid crystal molecules 5 of the liquid crystal layer 3 are aligned perpendicularly with respect to the common electrode and TFT substrates 1 and 2, a basic construction of the liquid crystal display is completed.

The liquid crystal molecules 5 of the liquid crystal layer 3 are aligned so the directors of the liquid crystal molecules 5 are inclined perpendicularly to the common electrode and TFT substrates 1 and 2 when no electrical field is applied between the first and second pixel electrodes 80 and 81 and the common electrode 140, and have negative dielectric anisotropy.

The common electrode and TFT substrates 1 and 2 are disposed such that the first and second pixel electrodes 80 and 81 overlap their corresponding color filter 130. By doing so, the first through fourth sub-pixel electrodes 82, 83, 85, and 87 are divided into a plurality of domains by the first and second cutouts 142 and 144 of the common electrode 140. Here, as shown in FIG. 3, the first through fourth sub-pixel electrodes 82, 83, 85, and 87 are bent and each divided into two laterally opposite parts by the first cutout 142 and the second cutout 144. However, the liquid crystal molecules 5 corresponding to the first through fourth sub-pixel electrodes 82, 83, 85, and 87 are aligned in four different directions with respect to the bent portions of the first through fourth sub-pixel electrodes 82, 83, 85, and 87. For example, when an area (see W2) defined by a long side of the third sub-pixel electrode 85 and a long side of the second cutout 144 of the common electrode 140 is defined as a domain, the four different directions of the liquid crystal molecules 5 corresponding to one of the first through fourth sub-pixel electrodes 82, 83, 85, and 87 can define four domains. That is, each pixel electrode including two sub-pixel electrodes is divided into eight domains according to the alignment directions of the major directors of liquid crystal molecules in a liquid crystal layer in a voltage-on state. At this time, a distance between two opposing long sides of each domain, i.e., the width W2 of each domain may be about 30 μm to about 35 μm.

While the exemplary embodiment of the present invention has illustrated that one pixel is divided into eight domains, the present invention is not limited thereto. One pixel may also be divided into more than eight domains.

In another embodiment, other constituent elements such as a polarization plate, a backlight, and a compensation plate are added to the above-described fundamental structure to complete a liquid crystal display.

In this case, two polarization plates (not shown) may be provided on the common electrode and TFT substrates 1 and 2, respectively, wherein the transmission axis of one of the polarization plates is parallel to the first and second gate lines 22$a$ and 22$b$, whereas the transmission axis of the other polarization plate is perpendicular to the first and second gate lines 22$a$ and 22$b$. By doing so, the liquid crystal molecules 5 are aligned at an angle of about 45 degrees with respect to the transmission axes of the polarization plates in all the domains, thereby maximizing brightness.

Each of the common electrode and TFT substrates 1 and 2 may include an alignment layer (not shown) that allows the liquid crystal molecules 5 to be aligned perpendicularly or parallel with respect to the common electrode and TFT substrates 1 and 2.

Hereinafter, the polarities of data signals applied to pixel electrodes and the behavior of liquid crystal molecules when an electrical field is applied between the pixel electrodes and a common electrode in a liquid crystal display according to an embodiment of the present invention will be described in more detail with reference to FIGS. 6A, 6B, and 7.

First, referring to FIGS. 6A and 6B, a first pixel electrode 80 (not shown) and a second pixel electrode 81 receive complementary data signals (opposite polarities) from first and second data lines (refer to reference numerals 62a and 62b in FIG. 1). A driving method for applying data signals of opposite polarities to the first pixel electrode 80 and the second pixel electrode 81 will now be described.

FIG. 6A illustrates a dot-inversion driving method in which data signals applied to the first and second data lines Dn and Dn+1 (e.g., 62a and 62b) have alternately opposite polarities. That is, a data signal having positive (+) polarity and a data signal having negative (−) polarity are sequentially and repeatedly applied to the first data line Dn, whereas a data signal having negative polarity and a data signal having positive polarity are sequentially and repeatedly applied to the second data line Dn+1. For example, the first data signal having positive polarity among data signals applied to the first data line Dn is applied to a first sub-pixel electrode 82 of the first pixel electrode 80 via a first thin film transistor TFT1 connected to a gate line Gn+1, and is also applied to a second sub-pixel electrode 83 via a first bridge 84. On the other hand, the first data signal having negative polarity among data signals applied to the second data line Dn+1 is applied to a third sub-pixel electrode 85 of the second pixel electrode 81 via a second thin film transistor TFT2 connected to a gate line Gn, and is also applied to a fourth sub-pixel electrode 87 via a second bridge 89.

Since the polarities of signals applied between the first sub-pixel electrode 82 and the third sub-pixel electrode 85, between the second sub-pixel electrode 83 and the fourth sub-pixel electrode 87, and between the second sub-pixel electrode 83 and the third sub-pixel electrode 85 are opposite to each other, strong lateral electrical fields are formed at inter-subpixel electrode gaps (see 92, 93, and 94 of FIG. 1). That is, since signals having opposite polarities are applied to two adjacent sub-pixel electrodes disposed on the same plane, such strong lateral electrical fields are formed.

FIG. 6B illustrates a line-inversion driving method in which data signals of opposite polarities are respectively applied to first and second data lines Dn and Dn+1 (e.g., 62a and 62b) during a period of one frame. That is, the first data line Dn receives positive voltage as a data signal and the second data line Dn+1 receives negative voltage as a data signal during a period of one frame. Data signals of opposite polarities are applied to first and second pixel electrodes 80 and 81 in substantially the same manner as the dot-inversion driving method shown in FIG. 6A. Therefore, the polarities of two adjacent ones of interdigitated sub-pixel electrodes 82, 83, 85, and 87 are opposite to each other, and thus, lateral electrical fields are formed at inter-subpixel electrode gaps (see 92, 93, and 94 of FIG. 1) like in FIG. 6A.

FIG. 7 illustrates a behavior of liquid crystal molecules 5 in each of first through fourth domains D1, D2, D3, and D4 under a lateral electrical field and fringe electrical field. Referring to FIG. 7, the liquid crystal molecules 5 of the first and third domains D1 and D3 are inclined to the right at a predetermined angle, whereas the liquid crystal molecules 5 of the second and fourth domains D2 and D4 are inclined to the left at a predetermined angle.

As described above, the lateral electrical field is formed as indicated by a dotted line I at inter-subpixel electrode gaps 91, 92, and 93 when data signals are applied to first and second pixel electrodes 80 and 81. The fringe electrical field is formed as indicated by a dotted line f between a common electrode 140 and the inter-subpixel electrode gap 91, between a first cutout 142 and a first sub-pixel electrode 82, between the common electrode 140 and the inter-subpixel electrode gap 92, between a second cutout 144 and a third sub-pixel electrode 83, and between the common electrode 140 and the inter-subpixel electrode gap 93.

Here, when the fringe electrical field is applied to the liquid crystal molecules 5, the liquid crystal molecules 5 of each of the first through fourth domains D1, D2, D3, and D4 are aligned perpendicularly to a long side of each of the first through fourth domains D1, D2, D3, and D4. In particular, the alignment direction of the liquid crystal molecules 5 by the fringe electrical field is the same as that of the liquid crystal molecules 5 by the lateral electrical field. Thus, the lateral electrical field encourages the behavior of the liquid crystal molecules 5 of each of the first through fourth domains D1, D2, D3, and D4.

Since the behavior of the liquid crystal molecules 5 can be more effectively controlled by the lateral electrical field, the response speed can be increased. Therefore, even when the domain width W2 shown in FIG. 3 increases, the behavior of the liquid crystal molecules 5 can be effectively controlled. In this regard, the domain width W2 may be about 30 μm to about 35 μm. As the domain width W2 increases, the transmittance as well as the aperture ratio is increased.

Furthermore, when the gray scale ranges from black to white, a pretilt correction gray voltage and an overshooting correction gray voltage may be applied to the first and second data lines 62a and 62b, thereby increasing the response speed of the liquid crystal molecules 5. By doing so, the alignment direction of the liquid crystal molecules 5 can be determined prior to applying an electrical field to the common electrode 140 and the first and second pixel electrodes 80 and 81. In the exemplary embodiment of the present invention, the pretilt correction gray voltage is preferably in a range of about 2.5V to about 2.9V.

FIG. 8 is a layout view of a liquid crystal display according to another embodiment of the present invention.

Referring to FIG. 8, each of first and second data lines 62a and 62b includes a zigzag portion which are three times bent along the lengthwise direction of a pixel and a longitudinal portion which extends from both ends of the zigzag line. Here, two longitudinal portions face each other with respect to each of three bent portions of the zigzag line. One of the two longitudinal portions forms an angle of about 45 degrees with respect to a first gate line 22a or a second gate line 22b, and the other one of the two longitudinal portions forms an angle of about −45 degrees with respect to the first gate line 22a or the second gate line 22b. First and second pixel electrodes 280 and 281 and first and second cutouts 242 and 244 are formed in band shapes which are three times bent according to the shape of a pixel.

Thus, sub-pixel electrodes 282, 283, 285, and 287 are divided into multiple domains by the first and second cutouts 242 and 244. That is, since each of the sub-pixel electrodes 282, 283, 285, and 287 is bent in zigzag forms and longitudinally divided by the first cutout 242 or the second cutout 244, liquid crystal molecules corresponding to each of the sub-pixel electrodes 282, 283, 285, and 287 are aligned in eight different directions with respect to the three bent portions of the zigzag line and the first cutout 242 or the second cutout 244. Therefore, each pixel electrode including two sub-pixel electrodes are divided into 16 domains according to alignment directions of the major directors of liquid crystal molecules in a liquid crystal layer under an electrical field. Here, a distance between two long sides of each domain, that is, a domain width, may be in a range of about 30 μm to about 35 μm. As such, as the number of domains increases, a liquid crystal display can have a better viewing angle.

In the liquid crystal display of the exemplary embodiment of the present invention, the polarities of the first and second pixel electrodes 280 and 281 and the behavior of the liquid crystal molecules are as described above in the previous embodiments illustrated with reference to FIGS. 1 through 7.

While the exemplary embodiment of the present invention has illustrated that the first and second data lines 62a and 62b, the first and second pixel electrodes 280 and 281, and the first and second cutouts 242 and 244 have three bent portions, the present invention is not limited thereto. That is, data lines, pixel electrodes, and cutouts of the present invention may have more than three bent portions.

Data signals of opposite polarities are applied to pixel electrodes and sub-pixel electrodes of each pixel electrode that are alternately engaged, i.e., interdigitated, with each other and that have opposite polarities. Thus, a lateral electrical field is formed at a gap between two adjacent sub-pixel electrodes. The lateral electrical field, together with a fringe electrical field formed between a common electrode and the pixel electrodes, enables liquid crystal molecules to be controlled more easily. Therefore, when an electrical field is applied to the pixel electrodes and the common electrode, an improvement in response speed and transmittance of the liquid crystal display can be achieved. In addition, the liquid crystal display can have a wider domain width while maintaining response speed and transmittance.

In concluding the detailed description, those skilled in the art will appreciate that many variations and modifications can be made to the exemplary embodiments without substantially departing from the principles of the present invention. Therefore, the disclosed exemplary embodiments of the present invention are used in a descriptive sense only and not for purposes of limitation.

What is claimed is:

1. A liquid crystal display comprising:
   a first substrate;
   a second substrate opposite to and facing the first substrate; and
   a liquid crystal layer interposed between the first substrate and the second substrate, wherein:
   the first substrate includes a common electrode,
   the second substrate includes
   gate lines disposed on an insulating plate;
   first and second data lines insulated from and intersecting the gate lines and receiving complementary data signals;
   a first thin film transistor connected to the first data line;
   a second thin film transistor connected to the second data line;
   a first pixel electrode connected to an output terminal of the first thin film transistor, the first pixel electrode including a first sub-pixel electrode and a second sub-pixel electrode; and
   a second pixel electrode connected to an output terminal of the second thin film transistor, the second pixel electrode including a third sub-pixel electrode and a fourth sub-pixel electrode,
   wherein the first pixel electrode has two or more interconnected sub-pixel electrodes, the second pixel electrode has two or more interconnected sub-pixel electrodes, and the sub-pixel electrodes of the first pixel electrode are interdigitated with the sub-pixel electrodes of the second pixel electrode, and
   wherein a side of the first sub-pixel electrode is adjacent a side of the third sub-pixel electrode, an opposite side of the third sub-pixel electrode is adjacent a side of the second sub-pixel electrode, an opposite side of the second sub-pixel electrode is adjacent the fourth sub-pixel electrode, and the first sub-pixel electrode is connected to the second sub-pixel electrode, and the third sub-pixel electrode is connected to the fourth sub-pixel electrode.

2. The liquid crystal display of claim 1, wherein the first pixel electrode further comprises a first bridge connecting the first sub-pixel electrode to the second sub-pixel electrode.

3. The liquid crystal display of claim 2, wherein the first bridge overlaps the gate lines.

4. The liquid crystal display of claim 2, further comprising a storage electrode line parallel to the gate lines, wherein the first bridge overlaps the storage electrode line.

5. The liquid crystal display of claim 1, wherein the second pixel electrode further comprises a second bridge connecting the third sub-pixel electrode to the fourth sub-pixel electrode.

6. The liquid crystal display of claim 5, wherein the second bridge overlaps the gate lines.

7. The liquid crystal display of claim 5, further comprising a storage electrode line parallel to the gate lines, wherein the second bridge overlaps the storage electrode line.

8. The liquid crystal display of claim 1, wherein the complementary data signals applied to the first and second data lines are for dot-inversion driving.

9. The liquid crystal display of claim 1, wherein the complementary data signals applied to the first and second data lines are for line-inversion driving.

10. The liquid crystal display of claim 1, wherein an area of the first pixel electrode is substantially the same as that of the second pixel electrode.

11. The liquid crystal display of claim 1, wherein a spacing between the sub-pixel electrodes that are adjacent one another is in a range of about 6 μm to about 8 μm.

12. The liquid crystal display of claim 1, wherein the common electrode comprises domain-dividing means, the sub-pixel electrodes of the first and second pixel electrodes are divided along the first and second data lines by the domain-dividing means, and the domain-dividing means is disposed over the sub-pixel electrodes of the first and second pixel electrodes.

13. The liquid crystal display of claim 12, wherein the domain-dividing means is a cutout or a protrusion.

14. The liquid crystal display of claim 12, wherein each of the sub-pixel electrodes of the first and second pixel electrodes is longitudinally divided into substantially two equal parts by the domain-dividing means.

15. The liquid crystal display of claim 1, wherein each of the first and second pixel electrodes is divided into eight domains according to alignment directions of major directors of liquid crystal molecules in the liquid crystal layer under an electrical field.

16. The liquid crystal display of claim 15, wherein a width of each domain is in a range of about 30 μm to about 35 μm.

17. The liquid crystal display of claim 1, wherein each of the first and second pixel electrodes is formed in a shape of a band bent at least once.

18. The liquid crystal display of claim 1, wherein the gate lines extend in a first direction and the first and second data lines extend in a second direction.

19. The liquid crystal display of claim 1, wherein the gate lines extend in a first direction, and each of the first and second data lines has a portion that is bent once or more and a portion that extends in a second direction.

20. The liquid crystal display of claim 19, wherein in the first and second data lines, the portion of that is bent includes two linear portions, one linear portion forming an angle of about 45 degrees with respect to the gate lines, and the other linear portion forming an angle of about −45 degrees with respect to the gate lines.

21. The liquid crystal display of claim 1, wherein when a gray scale ranges from black to white, the first and second data lines receive a pretilt correction gray signal voltage and an overshoot correction gray signal voltage.

22. The liquid crystal display of claim 21, wherein when a number of each of the first and second pixel electrodes is one, the pretilt correction gray signal voltage is in a range of about 2.5V to about 2.9V.

23. The liquid crystal display of claim 1, further comprising an organic film below the first and second pixel electrodes.

24. The liquid crystal display of claim 1, wherein liquid crystal molecules of the liquid crystal layer have negative dielectric anisotropy and the long axes of the liquid crystal molecules are aligned perpendicularly with respect to the first and second substrates.

25. The liquid crystal display of claim 1, wherein the first substrate further comprises a color filter and the first and second pixel electrodes correspond to different color components of the color filter.

26. A liquid crystal display comprising:
 a first substrate;
 a second substrate opposite to and facing the first substrate; and
 a liquid crystal layer interposed between the first substrate and the second substrate,
 wherein the first substrate includes a common electrode,
 wherein the second substrate includes
  gate lines disposed on an insulating plate;
  first and second data lines insulated from and intersecting the gate lines and receiving complementary data signals;
  a first thin film transistor connected to the first data line;
  a second thin film transistor connected to the second data line;
  a first pixel electrode connected to an output terminal of the first thin film transistor; and
  a second pixel electrode connected to an output terminal of the second thin film transistor,
 wherein the first and second pixel electrodes have interdigitated portions,
 wherein a first side of the first pixel electrode is adjacent a first side of the second pixel electrode and a second other side of the first pixel electrode is adjacent a second other side of the second pixel electrode subpixel electrode,
 wherein the complementary data signals applied to the first and second data lines are for dot-inversion driving or for line-inversion driving, and
 wherein an area of the first pixel electrode is substantially the same as that of the second pixel electrode.

* * * * *